June 22, 1948.  R. S. TUSING  2,443,669
SWITCHGEAR APPARATUS
Filed Feb. 1, 1945  3 Sheets-Sheet 1
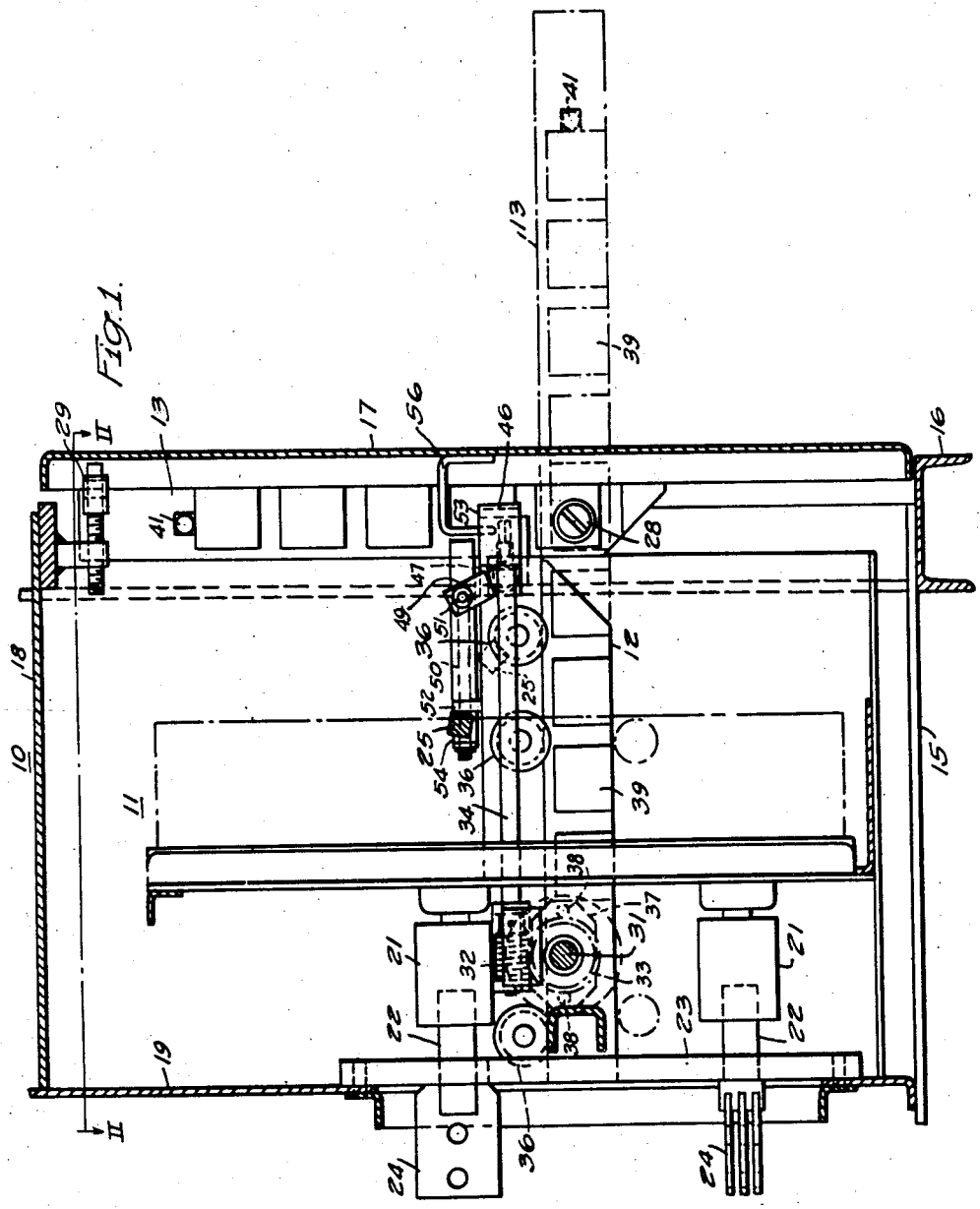
WITNESSES:
INVENTOR
Roy S. Tusing.
BY
ATTORNEY

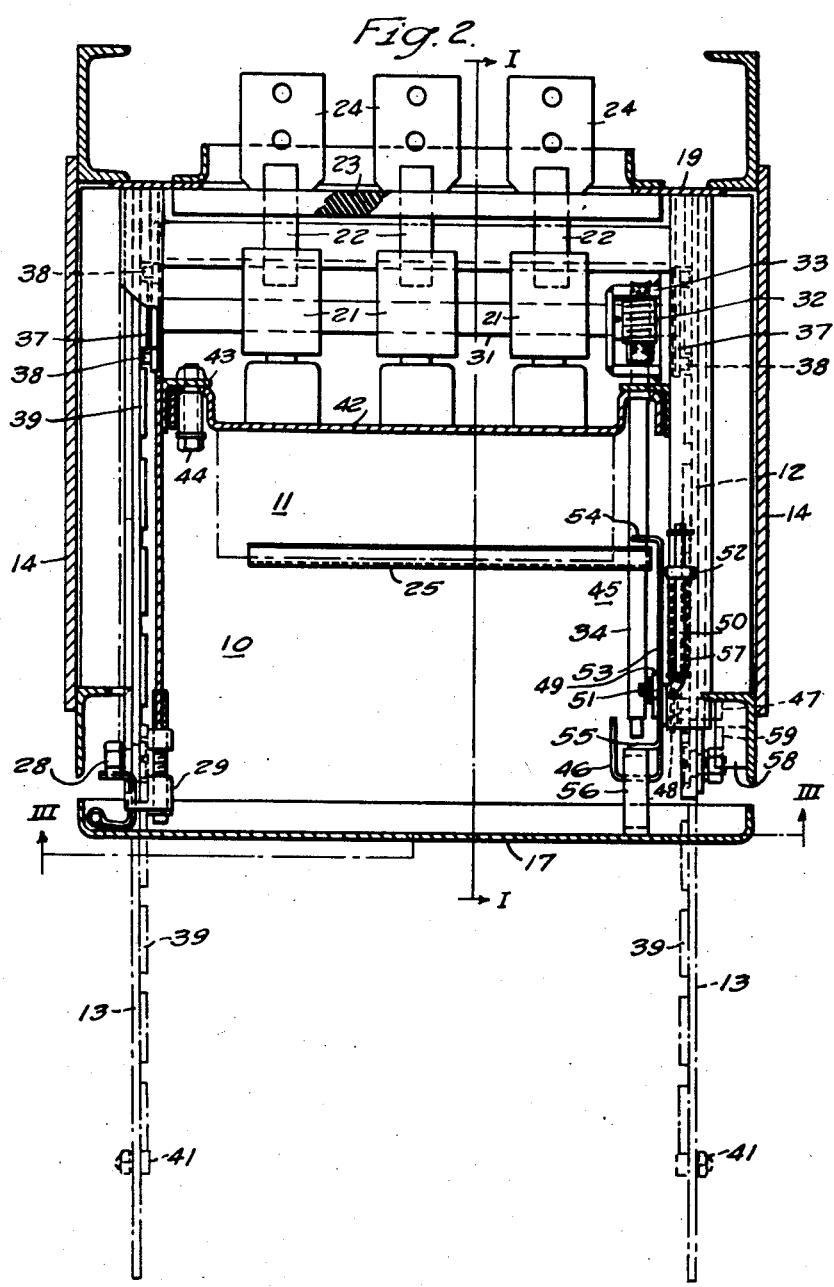

June 22, 1948. R. S. TUSING 2,443,669
SWITCHGEAR APPARATUS
Filed Feb. 1, 1945 3 Sheets-Sheet 3
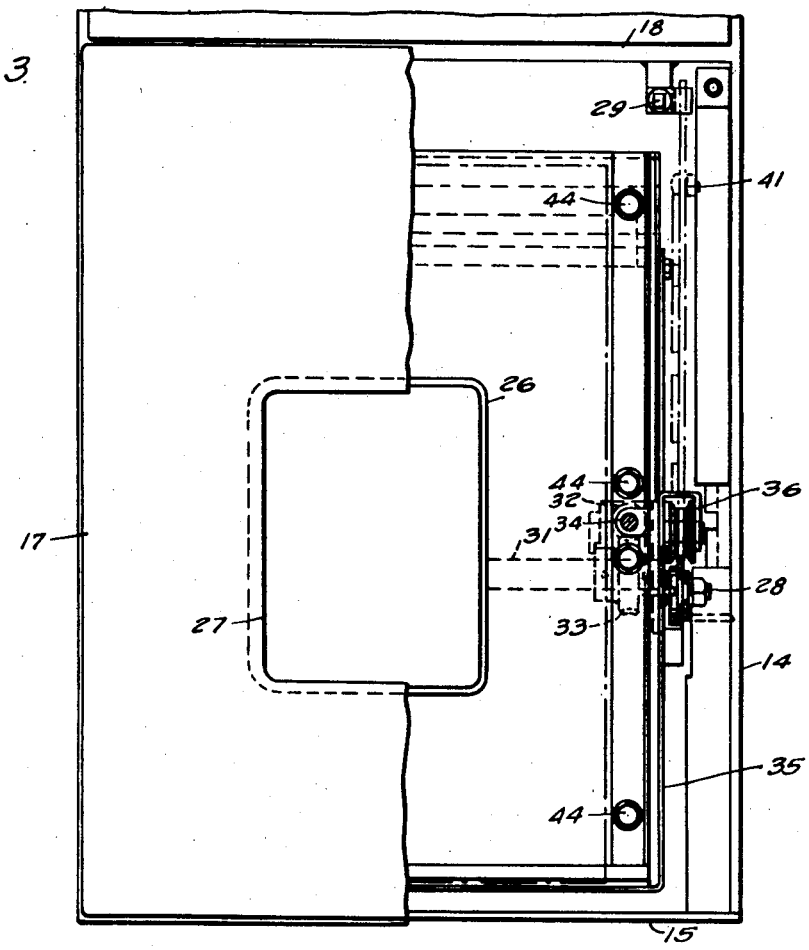
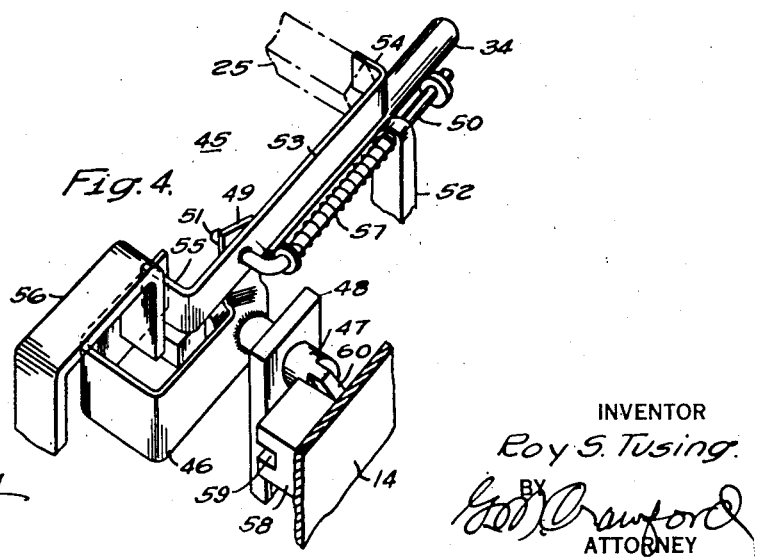
WITNESSES:
E. A. McCloskey
T. B. Elliott
INVENTOR
Roy S. Tusing.
BY
G. D. Crawford
ATTORNEY Patented June 22, 1948

2,443,669

UNITED STATES PATENT OFFICE 2,443,669

SWITCHGEAR APPARATUS

Roy S. Tusing, Turtle Creek, Pa., assignor to Westinghouse Electric Corporation, East Pittsburgh, Pa., a corporation of Pennsylvania Application February 1, 1945, Serial No. 575,687

4 Claims. (Cl. 200—50)

My invention relates, generally, to switchgear apparatus and, more particularly, to metal-clad switchgear of the horizontal drawout type.

When switchgear of the drawout type is installed on a ship, it is essential that there be no possibility of any of the removable apparatus units, such as circuit breakers, becoming displaced by the rolling of the vessel. It is also essential that the apparatus units can be readily inspected and replaced by another unit when necessary.

An object of my invention is to provide a drawout mechanism for switchgear apparatus having positive means for securing the removable unit in either of its extreme positions or in any intermediate position between its limits of travel.

Another object of my invention is to provide a drawout mechanism for switchgear apparatus which provides a symmetrical force at both sides of the enclosing cell for moving the removable unit into and out of the cell.

A further object of my invention is to provide a drawout mechanism having no limitations to the distance of travel of the removable unit other than the length of the rail extensions which support the unit.

Still another object of my invention is to provide a drawout mechanism which permits the apparatus unit to be removed from the end of the rails without disconnecting any parts attached to the cell.

A still further object of my invention is to provide a drawout mechanism which is simple, more compact and has fewer mechanical parts than prior mechanisms.

Another object of my invention is to so interlock the drawout mechanism and the operating mechanism for a removable circuit breaker unit that improper operation is prevented.

Other objects of my invention will be explained fully hereinafter or will be apparent to those skilled in the art.

According to one embodiment of my invention, a removable circuit breaker unit and its supporting truck are rolled into and out of a cell on an extensible track by a rotating shaft which extends across the truck and is provided with members at its ends which engage members at the sides of the cell to secure the truck in any position. The shaft is rotated by a worm and gear operated from the front of the truck.

For a fuller understanding of the nature and objects of my invention, reference may be had to the following detailed description, taken in conjunction with the accompanying drawing, in which:

Figure 1 is a view, partially in section and partially in side elevation, taken on the line I—I of Fig. 2, of a portion of a switchgear structure embodying my invention;

Fig. 2 is a view, partially in section and partially in plan, taken on the line II—II of Fig. 1, of the structure shown in Fig. 1;

Fig. 3 is a view, in front elevation, taken on the line III—III of Fig. 2, of the switchgear structure, a portion being broken away for clearness; and Fig. 4 is an enlarged view, in perspective, of an interlocking device for the drawout mechanism.

Referring to the drawing, the structure shown therein comprises a portion of a cell 10 which may be of the usual metal-enclosed type, suitable for housing a removable circuit breaker unit 11 which is mounted in the cell on an extensible track having a fixed section 12 and a hinged section 13 disposed at each side of the cell 10. As shown, the cell 10 comprises side members 14, a base 15 which may be mounted on channel members 16, a door 17, a partition 18 which divides the cell 10 from a similar cell disposed above the one shown, and a rear wall or barrier 19.

The circuit breaker 11 is of the drawout type and is provided with suitable disconnect contact members 21 for engaging fixed contact members 22 which are mounted on an insulating base 23 disposed at the rear of the cell 10 and supported by the partition 18. Suitable connections 24 are provided on the contact members 22 for connecting power conductors to these members.

The circuit breaker 11 may be provided with an operating mechanism which includes a crossbar 25, which is actuated to the position shown by the broken lines in Fig. 1 when the contact members of the circuit breaker are opened to interrupt the circuit through the circuit breaker. The operating mechanism for the circuit breaker may be actuated by a handle (not shown) which is mounted on a panel 26 disposed in an opening 27 provided in the door 17.

As shown in Figs. 1 and 2, the extensible track members 13, which are hinged to the fixed track members 12 by bolts 28, may be lowered to a horizontal position to permit the breaker 11 to be withdrawn from the cell 10. When the breaker 11 is fully inserted into the cell, the hinged members 13 may be raised to a vertical position and secured by latch members 29, left-hand latch only being shown, thereby retaining the breaker in the cell. The door 17 may then be closed and the circuit breaker mechanism operated in the usual manner.

In order to provide a drawout mechanism which is capable of withdrawing the breaker 11 to a position well out in front of the cell 10 and also which has complete control of the movement of the breaker unit throughout its entire range of travel, a rotatable shaft 31 which is operated by a worm 32 and a gear 33 may be utilized to move the breaker unit into and out of the cell 10. The worm 32 may be driven by a shaft 34 which extends to the front of the cell 10. The shaft 31 is disposed transversely of a truck carriage 35 in which the circuit breaker unit 11 is mounted. The truck carriage 35 is provided with rollers 36 which engage the track members 12 and 13.

As shown more clearly in Figs. 1 and 2, a plate 37 is secured to each end of the shaft 31 and rotated thereby. A pair of spaced pins 38 is secured to each one of the plates 37. The pins 38 are disposed to engage spaced members 39 attached to the track 12 along the sides of the cell 10. Thus, when the shaft 31 is rotated, the truck carriage is driven either into or out of the cell 10, depending upon the direction of rotation of the shaft 31.

Since the spaced members 39 are also provided on the extensible portions 13 of the track and are in alignment with the spaced members on the inside of the cell when the track members 13 are in a horizontal position, the circuit breaker unit may be withdrawn completely out of the cell by means of the drawout mechanism. The distance the breaker can be rolled out in front of the cell is limited only by the length of the rail extensions, as there is no other mechanical tie to the cell. However, the movement of the breaker unit is at all times under the control of the drawout mechanism, and there is no danger of the breaker unit becoming out of control as a result of the movement of a ship or other structure in which the breaker is installed. The outward movement of the truck carriage may be stopped by bolts 41 inserted through the rails 13. If it is desired to remove the breaker unit from the track 31, the bolts 41 may be removed, thereby permitting the truck carriage to be removed from the rails.

As shown more clearly in Fig. 2, the breaker mechanism is mounted on a metal pan 42 which is secured to angle members 43 of the truck carriage 35 by bolts 44. When the truck carriage is out of the cell, the breaker unit may be removed from the truck by removing the bolts 44, and another breaker unit installed in its place. Thus, the truck and the breaker unit may be removed from the cell and also from the rails without removing any parts attached to the cell. In this manner, a breaker unit which has become inoperable may be readily replaced by another unit.

As explained hereinbefore, the breaker unit may be removed to a position well out in front of the cell while it is still on the rails 13, thereby making the breaker and cell parts completely accessible for inspection and maintenance. This feature is not obtainable with drawout mechanisms of previous types, such as long screw drives which move the rear of the breaker unit only to the front edge of the cell and cannot control the movement through a range of travel greater than the depth of the cell. Furthermore, the shaft 34, which operates the present drawout mechanism, is disposed entirely within the cell and concealed from view when the door 17 is closed.

In order to prevent the primary disconnect contact members 21 and 22 from being engaged or disengaged while the contact members of the circuit breaker are closed, a mechanical interlocking device 45 is provided. As shown more clearly in Fig. 4, the interlocking device 45 comprises a U-shaped member 46 which is secured to a shaft 47 rotatably mounted in a support 48 which is attached to the truck carriage 35.

The U-shaped member 46 has an upwardly extending arm 49, which is rotatably mounted on an inturned end 51, of a round bar 50, which is slidably disposed in a support 52, carried by the truck frame 35. A flat bar 53, having inturned ends 54 and 55, is secured to the inturned end 51 of the bar 50 as by welding.

As shown, the end 54 of the bar 53 is engaged by the cross-bar 25 of the circuit breaker mechanism when the contact members of the circuit breaker are closed. When the contact members are opened, the cross-bar 25 swings forwardly, as indicated in Fig. 1, thereby releasing the end 54 of the bar 53. When the door 17 is closed, the other end 55 of the bar 53 engages a U-shaped member 56 which is attached to the door 17.

Thus, when the door 17 is closed, the bar 53 is pushed inwardly against the compression of a spring 57 disposed on the round bar 50, and the U-shaped member 46 is raised to a position in which it will engage the lower end of the U-shaped member 56 to prevent the door from being opened while the end 54 of the bar 53 is engaged by the cross-bar 25 of the breaker. However, when the breaker is tripped, the bar 25 swings forwardly, as explained hereinbefore, thereby releasing the end 54, and the spring 57 will actuate the bar 53 forwardly as the U-shaped member 56 moves forwardly with the door 17. Thus, the member 46 swings downwardly about the shaft 47 and clears the lower end of the U-shaped member 56 to permit the door to be opened completely.

It will be noted that the cross-bar 25 of the circuit breaker mechanism is not attached to the bar 53; therefore, the circuit breaker mechanism is free to operate independently of the interlocking device at all times. As long as the door 17 is closed, the U-shaped member 56 retains the bar 53 in the position shown against the compression of the spring 57. Therefore, the breaker mechanism may be opened and closed without actuating the interlocking device so long as the door 17 is closed. However, as explained hereinbefore, the door 17 cannot be opened to gain access to the shaft 34 to operate the drawout mechanism so long as the contact members of the circuit breaker are closed.

In order to prevent the circuit breaker unit from being inserted into the cell while its contact members are closed, a block 58 having a groove 59 in one side thereof is secured to the side 14 of the cell 10. As shown, one end of the shaft 47 is provided with a rectangular portion 60 which can pass freely through the groove 59 when the contact members of the circuit breaker are opened, and the bar 53 is released from the cross member 25.

However, when the contact members of the breaker are closed and the bar 53 is retained in the position shown in the drawing, the shaft 47 is rotated to an angle in which the rectangular portion 60 cannot pass through the groove 59. Thus, if the breaker is closed, the inward movement of the breaker will be stopped by the block 58 before the primary disconnect contact members 21 and 22 are engaged. Furthermore, the breaker cannot be closed while the rectangular portion 60 of the shaft 47 is passing through the groove 59, since the bar 53 will prevent the cross-bar 25 from moving to the closed position of the breaker. After the rectangular portion 60 has passed through the block 58, the primary disconnect contact members are fully engaged and the breaker can then be closed in the usual manner.

From the foregoing description, it is apparent that I have provided a switchgear structure having a drawout mechanism for a removable circuit breaker unit which has complete control of the movement of the breaker unit throughout its entire range of travel. Furthermore, the distance the breaker unit can be moved out in front of the cell is limited only by the length of the rail extensions provided for supporting the breaker unit. The present mechanism provides a symmetrical force at both sides of the cell for moving the breaker to and from the "connected" position, thereby preventing any binding of the breaker unit and insuring correct alignment of the breaker with respect to the cell and disconnect contact members at all times.

Since numerous changes may be made in the above-described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In switchgear apparatus, in combination, a cell, an apparatus unit removably disposed in the cell, a track horizontally disposed in the cell and having an extensible portion extending outside of the cell, a truck mounted on the track for supporting said unit, a rotatable shaft disposed transversely of the truck, a plurality of spaced members disposed along the sides of the cell parallel to said track, additional spaced members disposed on the extensible portion of the track in alignment with the spaced members in the cell when the track is extended, members disposed at the ends of said shaft and actuated thereby to engage said spaced members, and means operable from the front of the truck for rotating said shaft to drive the truck into and out of the cell.

2. In switchgear apparatus, in combination, a cell, an apparatus unit removably disposed in the cell, a track horizontally disposed in the cell and having an extensible portion extending outside of the cell, a truck mounted on the track for supporting said unit, a rotatable shaft disposed transversely of the truck, a plurality of spaced members disposed on said track along the sides of the cell, additional spaced members disposed on the extensible portion of the track in alignment with the spaced members in the cell when the track is extended, members disposed at the ends of said shaft and actuated thereby to engage said spaced members, and worm and gear means operable from the front of the truck for rotating said shaft to drive the truck into and out of the cell.

3. In switchgear apparatus, in combination, a cell, a door for the cell, a circuit breaker unit removably disposed in the cell, a member carried by the breaker unit and actuated by the operating mechanism for the contact members of the circuit breaker, a pivotally mounted interlocking member for controlling the opening of the door, an interlocking bar engaged by the member carried by the breaker unit when the contact members of the breaker are closed to retain the interlocking member in a position to prevent opening the door, said interlocking bar being disengaged to permit operation of the interlocking member to a position which permits opening the door when the contact members of the breaker are open, spring means for biasing the interlocking member and the interlocking bar to the position which permits opening the door, blocking means secured to the cell, and means actuated by the interlocking bar to engage said blocking means to prevent inward movement of the breaker unit beyond a predetermined point while the contact members of the breaker are closed.

4. In switchgear apparatus, in combination, a cell, a door for the cell, a circuit breaker unit removably disposed in the cell, a member carried by the breaker unit and actuated by the operating mechanism for the contact members of the circuit breaker, a truck for supporting the breaker unit, a rotatable shaft carried by the truck, an interlocking member secured to said shaft for controlling the opening of the door, an interlocking bar engaged by the member carried by the breaker unit when the contact members of the breaker are closed to retain the interlocking member in a position to prevent opening the door, said interlocking bar being disengaged to permit operation of the interlocking member to a position which permits opening the door when the contact members of the breaker are open, and blocking means disposed in said cell to engage the end of said shaft to prevent inward movement of the truck beyond a predetermined point while the contact members of the breaker are closed.

ROY S. TUSING.

REFERENCES CITED

The following references are of record in the file of this patent:

UNITED STATES PATENTS

| Number | Name | Date |
| --- | --- | --- |
| 1,738,049 | Hanny | Dec. 3, 1929 |
| 1,863,224 | Kauffman et al. | June 14, 1932 |
| 1,869,856 | Macneil | Aug. 2, 1932 |
| 2,264,755 | Johnson et al. | Dec. 2, 1941 |
| 2,295,405 | Johnson et al. | Sept. 8, 1942 |
| 2,364,465 | Myers | Dec. 5, 1944 |

FOREIGN PATENTS

| Number | Country | Date |
| --- | --- | --- |
| 6,709 | Great Britain | Apr. 3, 1884 |